(12) United States Patent
Dunsmoir et al.

(10) Patent No.: US 7,174,506 B1
(45) Date of Patent: Feb. 6, 2007

(54) METHOD AND SYSTEM FOR PRODUCING DYNAMIC WEB PAGES

(75) Inventors: John W. Dunsmoir, Round Rock, TX (US); Sandra H. Jacobs, Austin, TX (US); Christopher Daniel Reech, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,004

(22) Filed: Nov. 5, 1999

(51) Int. Cl.
*G06F 17/00* (2006.01)

(52) U.S. Cl. .................................... 715/513

(58) Field of Classification Search ............... 707/513, 707/517; 715/513, 517, 536
See application file for complete search history.

(56) References Cited

U.S. PATENT DOCUMENTS

| | | | | | |
|---|---|---|---|---|---|
| 5,572,643 | A | | 11/1996 | Judson | 709/218 |
| 5,715,453 | A | * | 2/1998 | Stewart | 715/513 |
| 5,835,712 | A | * | 11/1998 | DuFresne | 709/203 |
| 5,845,303 | A | * | 12/1998 | Templeman | 715/517 |
| 5,890,175 | A | * | 3/1999 | Wong et al. | 715/505 |
| 5,937,160 | A | | 8/1999 | Davis et al. | 709/208 |
| 5,956,737 | A | * | 9/1999 | King et al. | 715/517 |
| 5,983,227 | A | * | 11/1999 | Nazem et al. | 707/10 |
| 5,987,480 | A | * | 11/1999 | Donohue et al. | 715/501.1 |
| 6,021,426 | A | * | 2/2000 | Douglis et al. | 709/200 |
| 6,055,522 | A | * | 4/2000 | Krishna et al. | 715/517 |
| 6,094,662 | A | * | 7/2000 | Hawes | 707/104.1 |
| 6,121,970 | A | * | 9/2000 | Guedalia | 345/760 |
| 6,262,729 | B1 | * | 7/2001 | Marcos et al. | 345/744 |
| 6,304,886 | B1 | * | 10/2001 | Bernardo et al. | 715/530 |
| 6,356,903 | B1 | * | 3/2002 | Baxter et al. | 707/10 |
| 6,397,217 | B1 | * | 5/2002 | Melbin | 707/10 |
| 6,484,150 | B1 | * | 11/2002 | Blinn et al. | 705/26 |
| 6,526,426 | B1 | * | 2/2003 | Lakritz | 715/536 |
| 6,559,861 | B1 | * | 5/2003 | Kennelly et al. | 345/703 |

OTHER PUBLICATIONS

Class java.util.Dictionary, Feb. 1998, <http://kahuna.sdsu.edu/jdk/api/java.util.Dictionary.html>, pp. 1-4.*

* cited by examiner

*Primary Examiner*—Sanjiv Shah
(74) *Attorney, Agent, or Firm*—Robert H. Frantz; David A. Mims, Jr.

(57) ABSTRACT

The invention provides systems, computer program products and methods for generating dynamic-content documents suitable for use on and transmission over computer networks, including the World Wide Web and the Internet. The dynamic-content documents are created based upon an extracted layout definition from a static web document with dynamic content mapped into the extracted layout definition. The invention is especially useful for application to Hypertext documents, such as Hyper Text Markup Language documents. The preferred embodiment disclosed is a Java servlet.

43 Claims, 8 Drawing Sheets

METHOD AND SYSTEM FOR PRODUCING DYNAMIC WEB PAGES

CROSS-REFERENCE TO RELATED APPLICATIONS

Claiming Benefit Under 35 U.S.C. 120

None.

FEDERALLY SPONSORED RESEARCH AND DEVELOPMENT STATEMENT

This invention was not developed in conjunction with any Federally sponsored contract.

MICROFICHE APPENDIX

Not applicable.

BACKGROUND OF THE INVENTION

1. Field of the Invention

This invention pertains to the arts of computer network, Internet and intranet web server technology, and especially to the arts of providing dynamic and variable web page content from a web server.

2. Description of the Related Art

The Internet and the World Wide Web have become critical, integral parts of commercial operations, personal lives, and the education process. Development activities of content for the World Wide Web is at an all-time high level, with expectations of tremendous growth to come. This is driven by even greater increases in the number of people and systems which are connected to the Internet and are exploiting its capabilities.

At the heart of the Internet content is Internet browser technology and Internet server technology. An Internet server contains content which is available to systems and browsers which have Internet connectivity. The most common type of Internet content is Hyper Text Markup Language documents.

Hyper Text Markup Language ("HTML") documents provide the content building blocks for designing World Wide Web pages. The HTML standard can trace its roots as far back as the 1960's. The Internet (interconnected network) was established in the early 1960's as nothing more than an interconnection of computers on a worldwide basis. By the mid-1970's, many research labs, universities and government agencies were on the network, and it was at that time known as ARPAnet.

A major problem that existed, however, was the lack of a standard protocol for communication. Each of the various groups was using its own protocol to run its internal network.

In 1982, a network protocol was implemented based on a paper entitled, "A Protocol for Packet Network Internetworking", published in 1974 by Cerf and Kahn. The paper set forth a method for transferring data between computers which were interconnected via the Internet, which became known as the Transmission Control Protocol/Internet Protocol ("TCP/IP"). This standard was quickly adopted around the world for Internet communications, and remains so today.

In 1991, an application called "Gopher" was created at the University of Minnesota. Gopher provided a useful method of presenting menus and organizing files on the Internet. The World Wide Web ("WWW") expanded upon the Gopher approach. Originally created by the European High-Energy Particle Physics Lab (CERN), the WWW added many improvements including graphics and, most importantly, hypertext links.

Under the CERN WWW definition, hypertext is a method of adding links to particular words, phrases, or graphics in a document such that when a user selects the element in the document, the user is automatically provided with a connection to another document or web server. To achieve this, the WWW implemented three technologies:

(a) HTML which was used to design and present web pages, (b) the Hyper Text Transfer Protocol for transmitting these web pages over the WWW, and (c) the conceptual definition of a web browser, which is a WWW client computer application that interprets and displays web pages received from a source such as a web server.

Using the WWW, HTTP and a web browser, users can easily create documents that are displayed to other users which visually look like pages in a book rather than a traditional computer screen appearance.

In 1993, the National Center for Supercomputing Applications (NCSA) at the University of Illinois at Champaign-Urbana developed and released a very powerful browser called "Mosaic". Due to it's being offered free of charge, it is estimated that over 2 million users had begun to use it to browse documents on the WWW by 1995. In the years following, Netscape Communications Corporation released its Navigator browser, and then Microsoft Corporation released its Explorer browser, both of which were compatible with HTML and HTTP.

HTML is analogous to the editor's marks on a written document. The "marks" of the markup language specify to the web browser how the information should be displayed to the user. For example, if one wants text to be displayed in bold, all that needs to be done is to "mark" the text to be displayed in bold. This is accomplished by surrounding the text with control characters, or "tags", which are bracketed by "< >" in the text. An HTML document is a text file containing information to be displayed, control characters, hyperlinks, and sometimes executable code. For example, a bold line of text in an HTML file would look like:

<b> This text is now bold </b>

The <b> tag turns on the bold attribute and the </b> tag turns off the bold attribute. Normally, the control characters are not displayed to the user by the browser software. Other control characters can set the color and size of text, define the use of a background color or graphics pattern or file, define the size and shape of tables, define drop down choice lists, locate and set the size for the insertion and display of graphics data, create radio buttons, and show hyperlinks as graphics or specially marked text. HTML is well known within the art.

HTML provides an elegant way to easily create pages that can contain complicated links to other documents through the use of hypertext links. Although HTML gained rapid acceptance, soon users wanted much more graphical power and content control capabilities.

FIG. 1 shows the fundamental client-server arrangement of Internet and intranet communications. A client browser computer (1) is provided with Internet access (2) to the World Wide Web (3) through common means such as a dial-up telephone line and modem, cable modem, or local area network ("LAN"). A web server computer (5) is likewise provided with Internet access (4) to the World Wide Web (3) using similar means, or higher-bandwidth means such as T1 and T3 data lines. Alternatively, client and servers may be interconnected via an Intranet (6), such as a corporate LAN. These arrangements are well known within the art.

FIG. 2 shows the prior art process of fetching and displaying static HTML pages from a web server over an Internet (3) or Intranet (6). When the user selects (10) a Universal Resource Locator ("URL") or hyperlink to view on his or her browser computer (1), the browser creates an HTTP request to fetch the file requested. The browser then transmits an HTTP GET command (11) via the World Wide Web (3) to the web server computer (5). The web server receives the command (12), and retrieves the requested static HTML file from its memory. Finally, the web server (5) transmits (13) the HTML file using the HTTP protocol to the client browser computer (14), where it is received (15), interpreted and displayed to the user.

The general limitation with basic HTML is that it is generally static in content. After a developer has designed an HTML page, the page is essentially fixed in its content, layout and appearance. Each time a user loads that page, it will look essentially the same as the day it was created by the developer.

A number of technologies have been developed to extend the capabilities of HTML to allow for some levels of dynamic, or changing, content of HTML pages, including:
  (a) HTML extensions, such as "server-side includes",
  (b) Common Gateway Interface ("CGI"), and
  (c) Client-side scripting.

A "server-side include" is a method of handling changing information provided that information resides on the same server as the base HTML page. A special tag is added in the HTML code for the base page that specifies the additional HTML file to be included. When the web server receives an HTTP request for a document, the web server first opens the requested document and searches to see if any additional files need to be included. If so, the server includes the file(s) and then sends the newly built document to the browser. An example "server-side include" is given in Table 1.

TABLE 1

Example Server-Side Include

Contents of the base HTML file:
<HTML>
<HEAD><TITLE>Example of a server-side include</TITLE></HEAD>
<BODY>
<!-- #INCLUDE FILE="MyInc.html"-->
<P>I can put other information here</P>
</BODY>
</HTML>
Contents of the "included"file MyInc.html:
<H1>Some simple text to include</H1>

FIG. 3 shows the basic steps involved for the "browsing" of HTML pages which implement "server-side includes". The process is very similar to the process to fetch static HTML pages as shown in FIG. 2 and described supra, with the exception that when the web server (5) receives the HTTP GET command, it retrieves (20) the HTML file, parses it for the server-side includes, fetches the data indicated by the server-side includes, replaces the HTML of the server-side includes with the data, and transmits (14) the whole HTML file (with included data) to the client browser computer (1).

Although "server-side includes" provide a basic method of incorporating information that changes periodically, they place a processing burden on the server since the server has to parse the entire document every time the document is requested. An additional problem is that available options on different web server platforms vary depending on the specific type of server being used.

Common Gateway Interface ("CGI"), is another well-known method for providing user interactivity. CGI is more sophisticated than "server-side includes". CGI scripting is a method that links the web server to other software applications, not just files, that can be executed on the server. CGI relies upon an additional layer to the HTTP transaction protocol which allows additional information to be passed from the browser to the server. This additional information is often information users fill out in forms that they submit, but it is not limited just to forms. When the server receives the information, it is passed to the CGI application and then sends the output of the application back to the browser. The output of the CGI application is a newly built HTML document.

Table 2 contains an example PERL application which could be executed by a web server in conjunction a CGI call from an HTML page when the page has been accessed by a browser.

TABLE 2

Example PERL Application print "Content-type: text/html\n\n";
print "<HTML>\n";
print "<HEAD><TITLE>This is a CGI Example</TITLE></HEAD>";
print "<BODY>\n";
print "<H1>Display this text on the page on the browser.</H1>\n";
print "</BODY>\n";
print "</HTML>\n;

When executed, the application of Table 2 would return the proper HTML code to display the text "Display this text on the page on the browser". Although this method is a more powerful way of allowing HTML code to be created dynamically based on information provided by the user, and it also provides a way to store user input on the server, this method also can require significant web server processing bandwidth, and may have varying feature support from one server platform to another.

The third well-known technology which allows for some level of dynamic content of HTML pages is "client-side scripting". Client-side scripting allows for client-executable code to be included in the HTML page, and to be executed on the browser/client platform after the HTML page is downloaded from the web server. Since the client platform is executing the script, the web server bandwidth problem of "server-side includes" and CGI scripting are avoided. The HTML version 4.0 standard supports client-side scripting using <SCRIPT> and <NOSCRIPT> tags.

And although just about any language could be used to implement the scripts, the most common in use today are JavaScript, JScript, VBScript and ECMAScript. The browser platform must support the particular script language, or it will not be executed correctly.

Using a client-side scripting language, the developer can insert instructions directly into the HTML code so that the script can be executed by the client platform when the page is loaded from the web server. The result of executing the script is that the script may generate some HTML code that tells the browser how to display information. By using other features such as Cascading Style Sheets and Document Object Models, client-side script processes can directly modify properties and attributes of document objects thereby causing the browser to modify the way the information is displayed.

Table 3 contains an example using JavaScript to display the current date on the web page.

TABLE 3

Example Client-Side Script in JavaScript

```
<HTML>
<HEAD><TITLE>Example of a client-side script in JavaScript
</TITLE></HEAD>
<BODY>
<SCRIPT LANGUAGE="JavaScript">
<! -Hide this code from non JavaScript enabledbrowsers
document.writeln("<H1>Today is </P>");
var today = new Date( );
var text= "The current date is" + (today.getMonth( ) + 1) + "/" +
today.getDate( ) + "/" +today.getYear( ) + ".";
document.writeln(text);
//-->
</SCRIPT>
</BODY>
</HTML>
```

The client-side script of Table 3 does nothing inbrowsers which do not support JavaScript, but will retrieve the system month, day, and year and print it on the browser screen prefaced by "The current date is".

Because this script is processed by the client computer platform, not the web server, the client platform must process the HTML document to find any scripts that need to be compiled and/or executed. When the document is loading, the script may actively create HTML code. The primary problem with client-side scripting is the compatibility issue, where many client browser software packages currently installed do not support the client-side scripting.

Therefore, there is a need in the art for a server-side technology which provides the ability to map dynamic data into an existing HTML document or HTML template. Further, there is a need in the art for this server-side technology to be platform independent, and to be indifferent to various hardware and software functionalities which may or may not be resident on a web server.

Finally, there is a need in the art for this server-side technology to be suitable for real-time processing of dynamic data into HTML templates without a burdensome processor bandwidth requirement of the web server processor.

SUMMARY OF THE INVENTION

The foregoing and other objects, features and advantages of the invention will be apparent from the following more particular description of a preferred embodiment of the invention, as illustrated in the accompanying drawing wherein like reference numbers represent like parts of the invention.

The method and system described produces HTML web pages which have dynamic content, but are based upon another HTML page which has been used as a template. The invention extracts a layout information, such as HTML tags, from a base HTML page to create a template, and then maps dynamic content into the template. The preferred embodiment disclosed is a JAVA servlet and the dynamic content may originate from any computer-readable media, such as communications interfaces, databases, or file systems.

BRIEF DESCRIPTION OF THE DRAWINGS

The following detailed description when taken in conjunction with the figures presented herein present a complete description of the present invention.

DETAILED DESCRIPTION

In the preferred embodiment, object-oriented programming techniques using Java are employed. As various implementations in Java of methods and data objects may yield equivalent execution and interface characteristics, the following detailed description of the Boson and its related support objects will be given in terms of the "contract" for each object rather than actual Java code. Where appropriate, the preferred embodiment will be highlighted in terms of use of specific Java methods to implement an operation, but those who are skilled in the art will readily recognize that alternative embodiments may be realized, without departure from the scope and spirit of the invention.

The selection of Java allows the functionality of the invention to be realized in a portable Java servlet, which can be installed on virtually any web server platform regardless of hardware, software and operating system employed on the web server. For purposes of example, the preferred web server platform is IBM's RS/6000 computer platform running IBM's AIX operating system. However, a Java servlet can equally well be used on a Microsoft Windows NT and IBM-compatible personal computer web server platform, as well as a Sun Microsystems Solaris-based workstation. The invention can be realized using other object-oriented programming languages, such as C++, or other structured languages such as VisualBasic, but the Java implementation offers the widest range of platform compatibility, an acceptable runtime execution profile, and highly compact, reusable code.

Prior to understanding the exact preferred implementation of the invention in Java, it is useful to have some fundamental understanding of Java servlets, how they operate, and their advantages. Java servlets are similar to applets in many ways. Applets and servlets are both run-time interpreted code. This means that the source software is compiled not to actual machine-dependent executable instructions, but to bytecodes. Bytecodes are primitive level operations which are not specific to a particular processor or operating system. Each platform that executes Java servlets and applets has a run-time interpreter which receives the applet or servlet, verifies it (checks it for errors and security violations), and interprets it into executable instructions for its processor. This allows a Java applet (or servlet) to be executed on virtually any operating system on virtually any hardware platform without recompiling the source code, making it truly portable code. Applets, however, are usually executed on a client platform, not a server platform, and typically include some user interfaces such as displays, form fields, etc. Servlets, however, typically reside and execute on web servers, and thus do not have a graphical user interface but rather interface to server components. For example, a servlet typically receives its data or "call" from a server as a result of an HTTP POST operation from a client machine.

Figure 1:
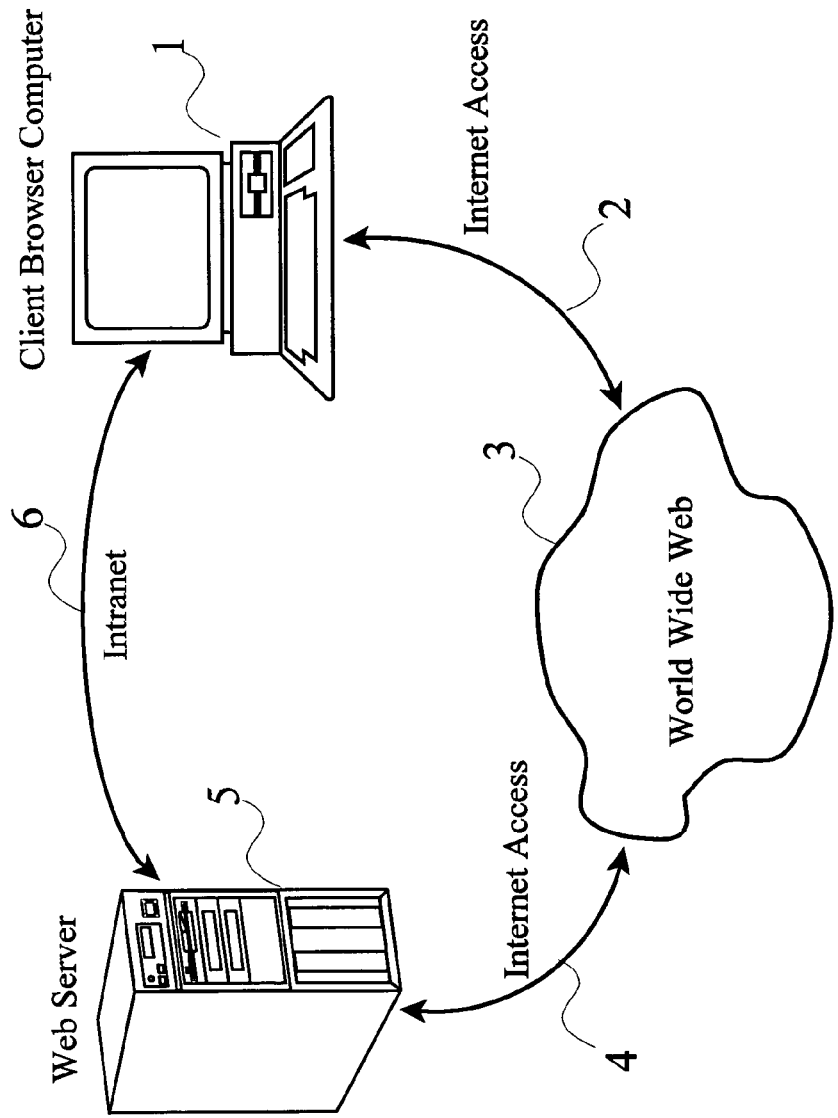
FIG. 1 discloses the prior art relationship between a client browser computer and a web server computer which are communicably interconnected by an Internet, the World Wide Web, or an intranet.
Figure 2:
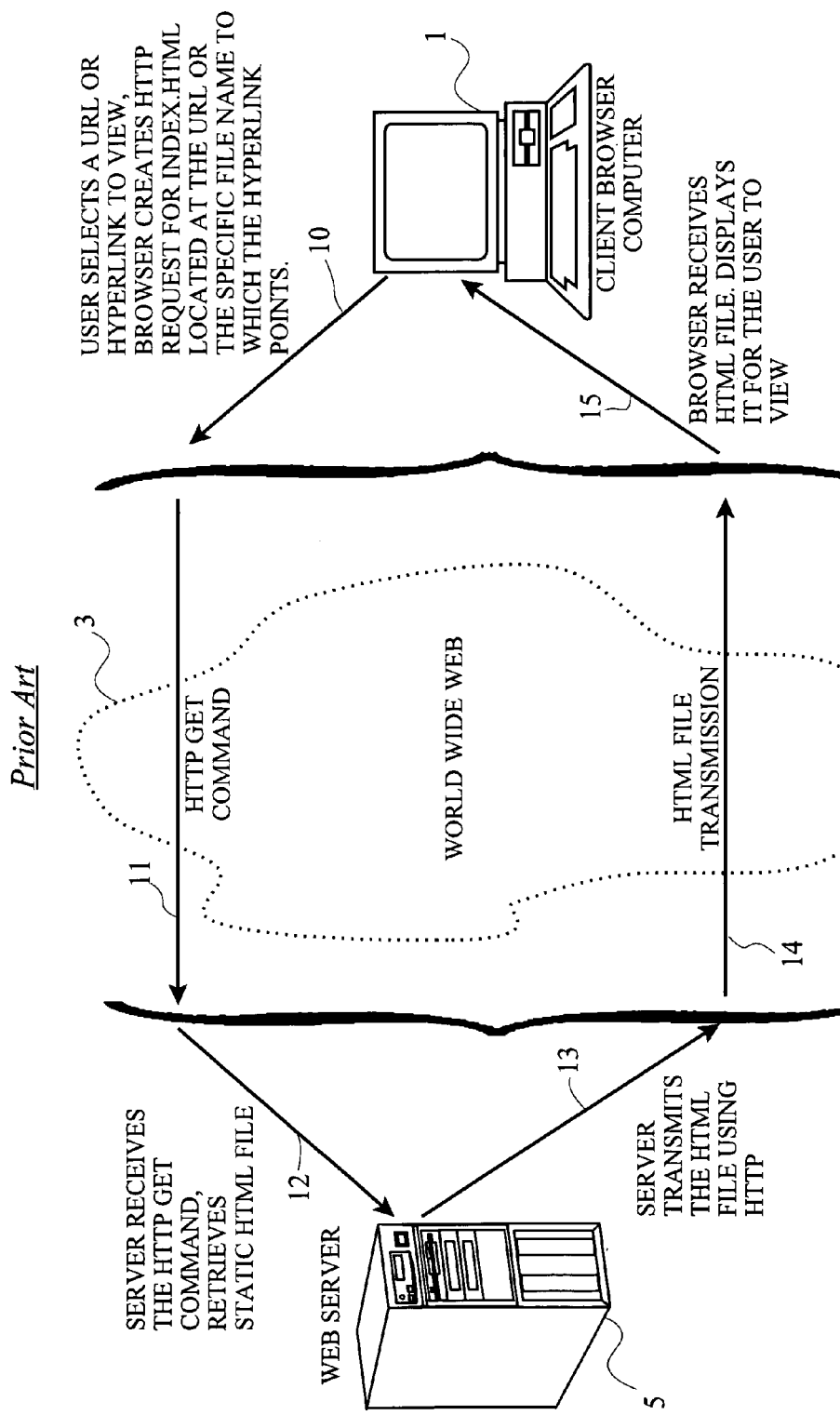
FIG. 2 shows the basic prior art process of retrieving static HTML pages from WWW server by a browser.
Figure 3:
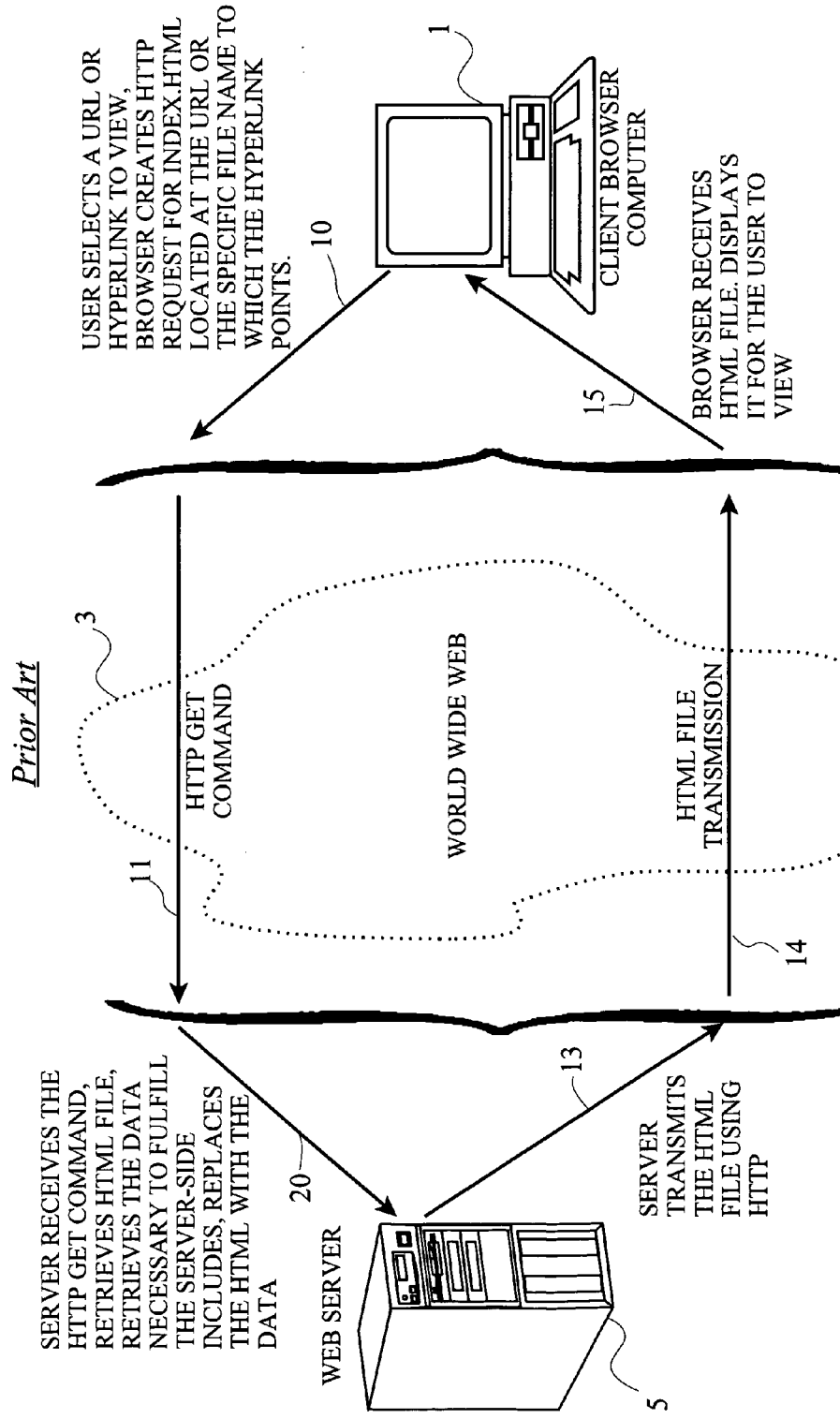
FIG. 3 depicts the prior art process of retrieving static HTML pages which incorporate "server-side includes".
Figure 4:
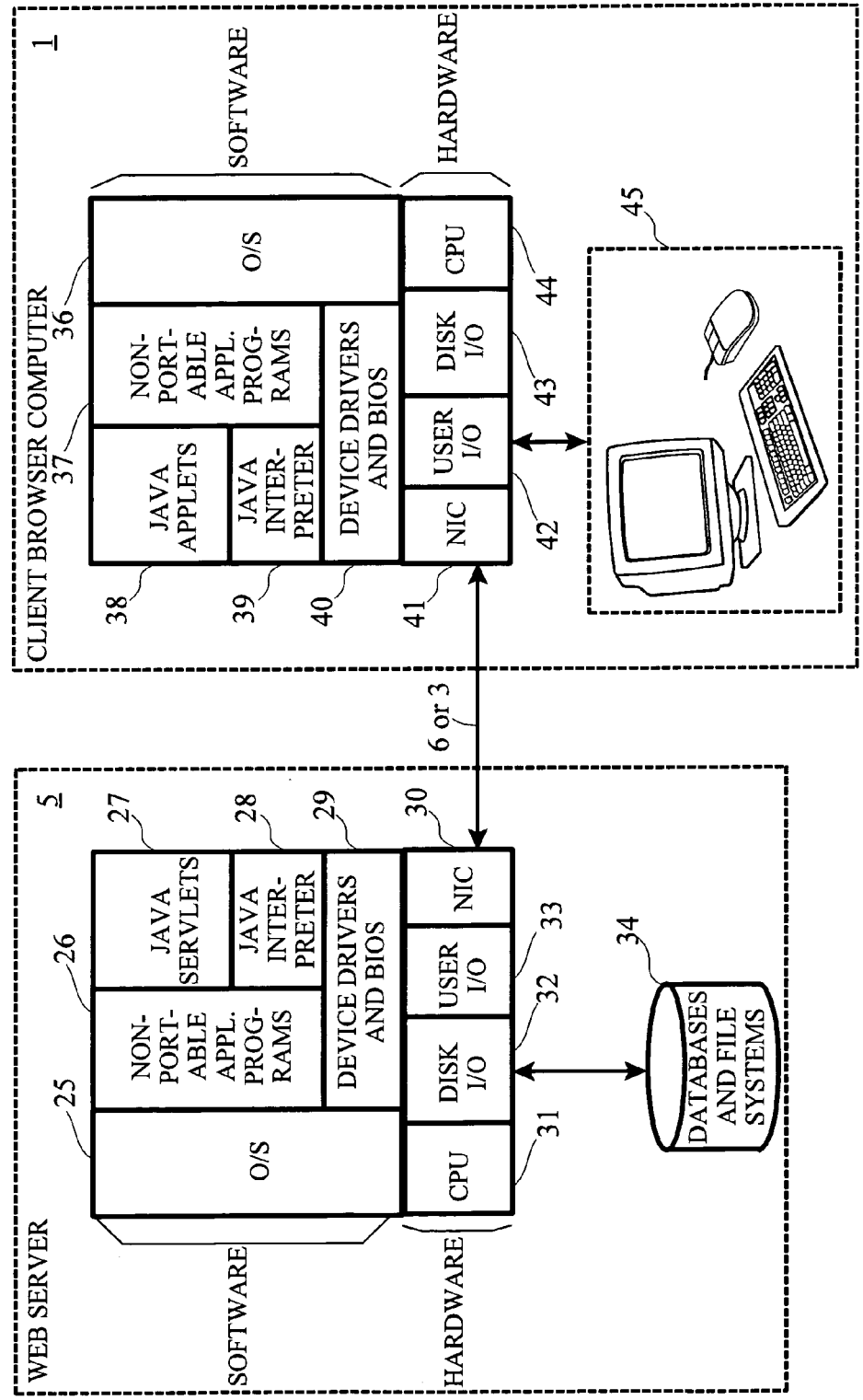
FIG. 4 discloses the hardware and software architectures of typical web server systems and client browser systems.

Turning to FIG. 4, the strikingly similar architectures of web servers and web browsers/clients are illustrated. The web server (5) typically consists of an operating system (25) such as AIX or UNIX, under which non-portable applications (26) written in languages such as C execute. Also in the web server platform, Java servlets (27) can run, which are real-time verified and interpreted by a Java Interpreter (28). The operating system (25), non-portable applications (26) and servlets (27) may all access the server system hardware, including the CPU (31), user I/O (33) such as a monitor and keyboard, disk I/O (32) such as a SCSI interface, and a network interface card ("NIC") (30) such as a Ethernet LAN interface card. The CPU (31) is usually a higher bandwidth enterprise-class unit, such as that in an IBM AS/400. Typically integrated into the operating system are necessary protocol stacks and functionality, such TCP/IP and HTTP, but this may also be provided as a non-portable application. The NIC (30) is interconnected to a Intranet (6) or directly to a router to the Internet (3). A significant component of most web servers is the database and file system (34), where HTML web pages, CGI scripts, and user databases are stored. User I/O is typically minimal, present primarily for maintenance and web master use.

As shown in FIG. 4, the architecture of a client browser system (1) is very similar to that of a web server, but with some notable differences. Similar to the web server, the client browser machine (1) has an operating system (36) which is more commonly MacOS or Microsoft Windows, and runs non-portable applications (37) including various desktop programs and a web browsers such as Netscape's Navigator or Microsoft's Explorer. The client browser can also run Java applets (38), rather than servlets, which are similarly verified and interpreted by a Java interpreter. The client machine (1) is also provided with aNIC (41), but more typically a clientNIC is LAN interface card or dial-up modem. The user I/O (42) is highly utilized on a client browser system (1) as graphical user interfaces incorporate use of the system display, mouse and keyboard (45). The disk I/O (43) is of moderate complexity, typically not providing sophisticated database capabilities but just local program and file storage. The CPU (44) is usually of a PowerPC or Pentium class, which is more appropriate for desktop computing applications.

Implementation of the base technology of the invention, called Boson and Quark, as a Java servlet provides several distinct advantages over other prior art approaches. Under previous approaches, a technology such as this may have been implemented as a development tool function, which would require the web developers to adopt the tool as their tool of choice. This is a technical and marketing burden that would be difficult to overcome. Following other prior art approaches would be to implement this invention as a proprietary server program, not a Java servlet, which may require special programming syntax, execution engines, maintenance programs, etc. On the contrary, implementing the base technology of the invention as a servlet which interfaces to common, standardized components of all web servers allows the invention to be a run-time function of the server which is tool and platform independent.

Figure 5:
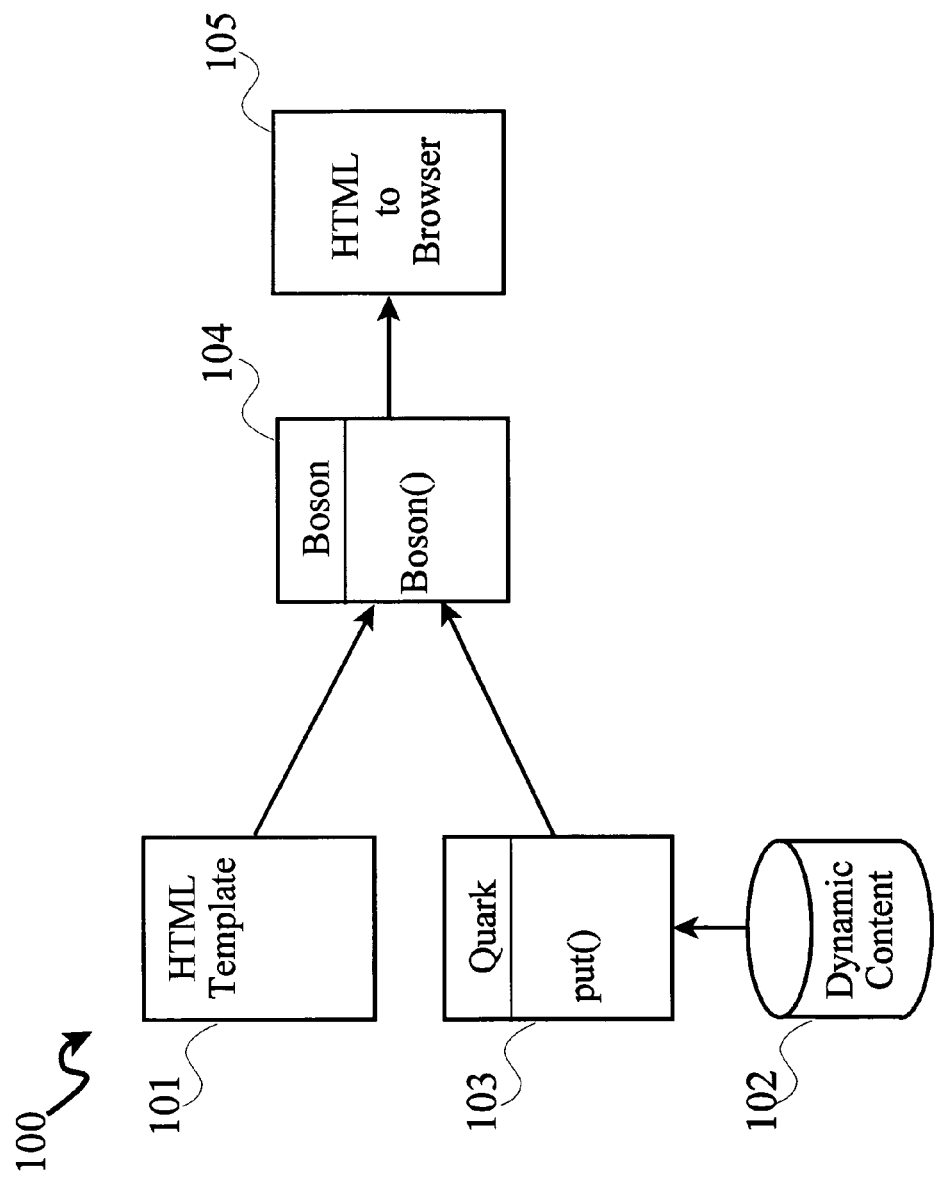
FIG. 5 shows the fundamental process of the invention.

Boson and Quark are the heart of the invention technology. Both are Java classes, which contain within them method and data object implementations. FIG. 5 shows the fundamental invention process (100). A base web document (101), such as a static HTML page, is used as a template for the HTML to be produced and sent to the browser (105).

The Quark data object (103) maps the static content of the HTML template (101), such as radio buttons, drop down lists, tables, graphic images, background and style definitions, and text information, to variable data structures. The Boson methods (104) then parse, or tokenize, the content of each line of the HTML template based upon known HTML TAG structures, and it replaces the static content of the page with different, variable content, referred to as the dynamic content (102). The resulting "dynamic" content HTML page (105) has the same visual layout as the original template, but presents possibly radically different information. For example, all the text may be replaced with text of a different language. Or, the background and style may be replaced, allowing the same information to be presented to a user based on his or her preferred presentation of colors and visual indicators. Or, a basic HTML layout can be applied to completely different information in real-time, presenting visually distinct pages with similar layout structures.

As the methods and data of Boson and Quark are implemented as a servlet, it can be operated real-time on a web server, allowing for real-time data to be merged with static HTML templates for applications such as stock quote presentation, merged video feeds and advertisement banners, remote system monitoring and maintenance (alarms, industrial systems, etc.). This also eliminates the need for a special development tool to provide non-real-time conversions from one data-plus-layout structure to another data-plus-layout structure. As shown in FIG. 5, dynamic data or content (102) may be received by Quark (103) from a number of sources, including but not limited to computer files, databases, other Java classes, session objects, or computer networks.

Figure 6:
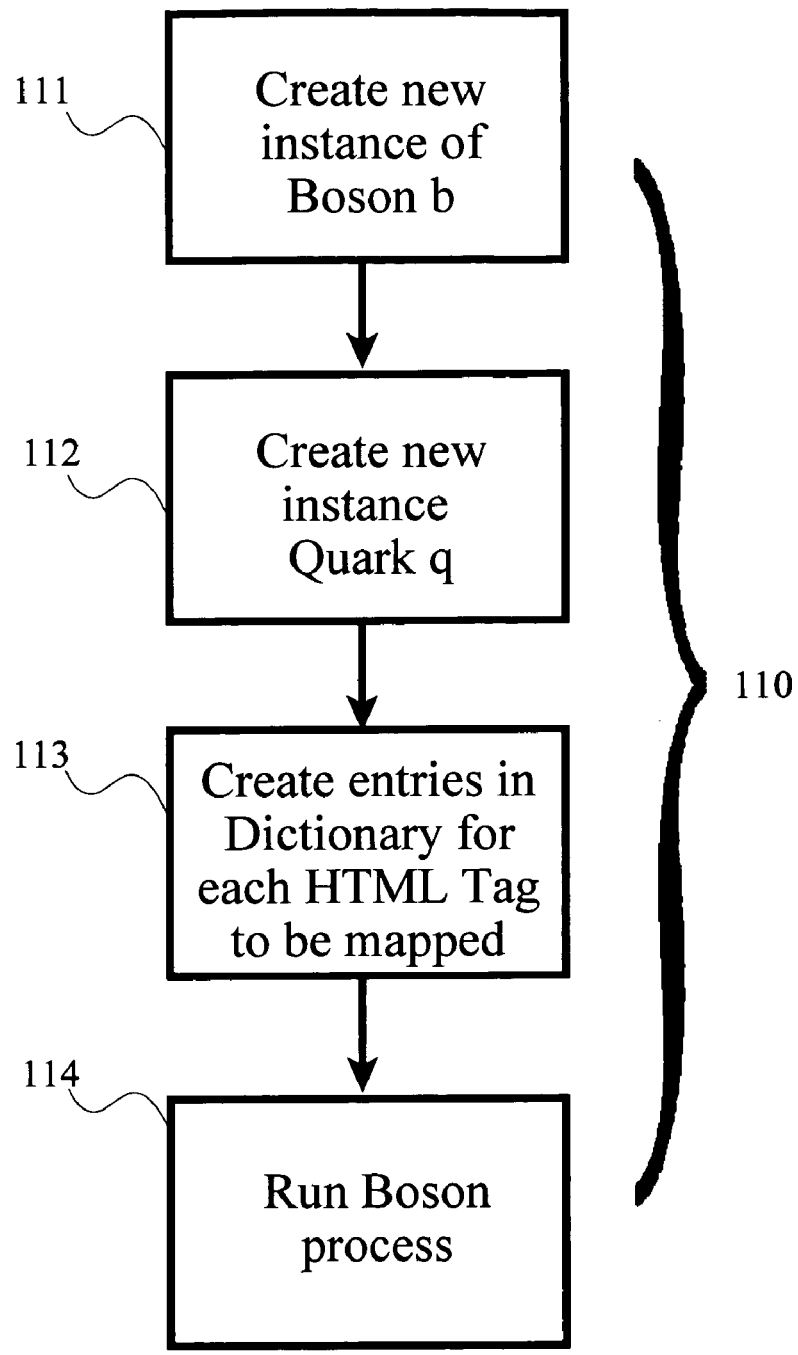
FIG. 6 sets forth the functional flow of the servlet

Quark is instantiated by the web server system, and it receives two parameters, namely the Boson tag name and the Dynamic content for the HTML Template Boson tag. Turning to FIG. 6, the functional flow (110) of Quark is shown. First, new instances of Quark and Boson are instantiated (111, 112). Then, Quark adds entries (113) into the system's dictionary, preferably the java.util.Dictionary, for each HTML tag to be mapped to dynamic structures. This is done in the preferred embodiment using the standard Java "put" method. Table 4 shows a typical "put" method for a single HTML tag which maps the HTML template to a variable data structure.

TABLE 4

| Quark "put" statement |
| --- |
| Boson b; |
| Quark q; |
| q = new Quark( ); |
| q.put("background", botBack); |

A separate "put" statement is preferably used for each HTML tag and structure type desired to be converted to dynamic content, including lists, table parameters, actions, radio buttons, check boxes, etc. As a final action, the servlet creates a Boson object and passes parameters of the Quark instance, "q", and a string object containing the HTML template name, as shown in Table 5.

TABLE 5

Servlet Creates Boson Object

Figure 7:
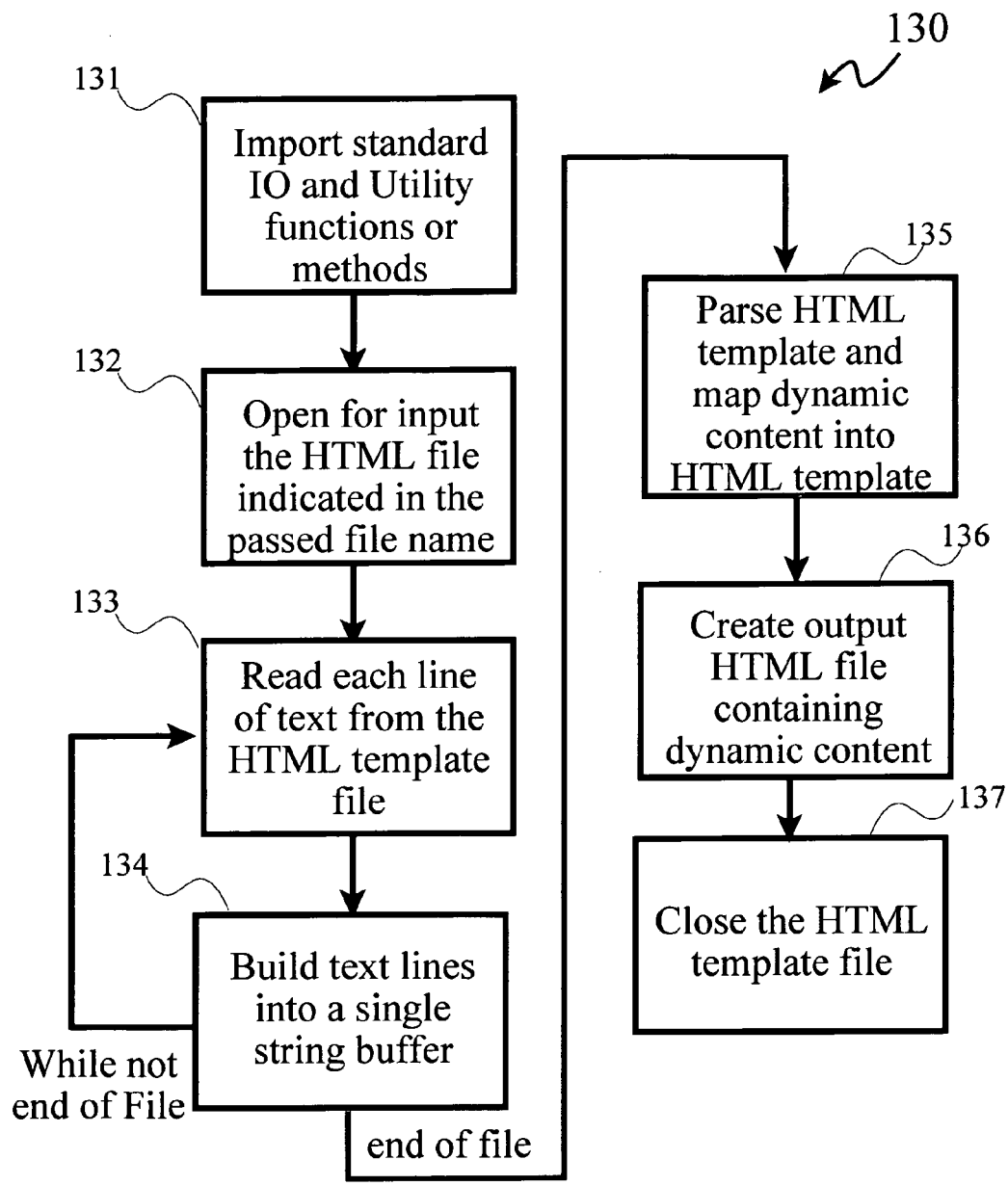
FIGS. 7 and 8 depict in detail the functional steps of the invention.

Boson b = new Boson ("t1.html", q);

The Boson method then finishes the task of mapping the dynamic content to the template, and returns the modified HTML page back to the client browser. Turning to FIG. 7, the preferred embodiment of the Boson method is depicted. The Boson (130) method first imports (131) the system standard input/output and utility functions or classes. In the preferred embodiment, this is simply done using a JAVA "import" declaration for java.io.* and java.util*. Then, Boson (130) opens the HTML file (132), reads (133) each line of the HTML source text file, builds (134) a single string buffer containing all of the HTML text, performs the TAG parsing and HTML content mapping process, and then either creates a new file (136) containing the mapped HTML content or passes the mapped HTML content directly back to a browser. Finally, the input file is closed (137).

Figure 8:
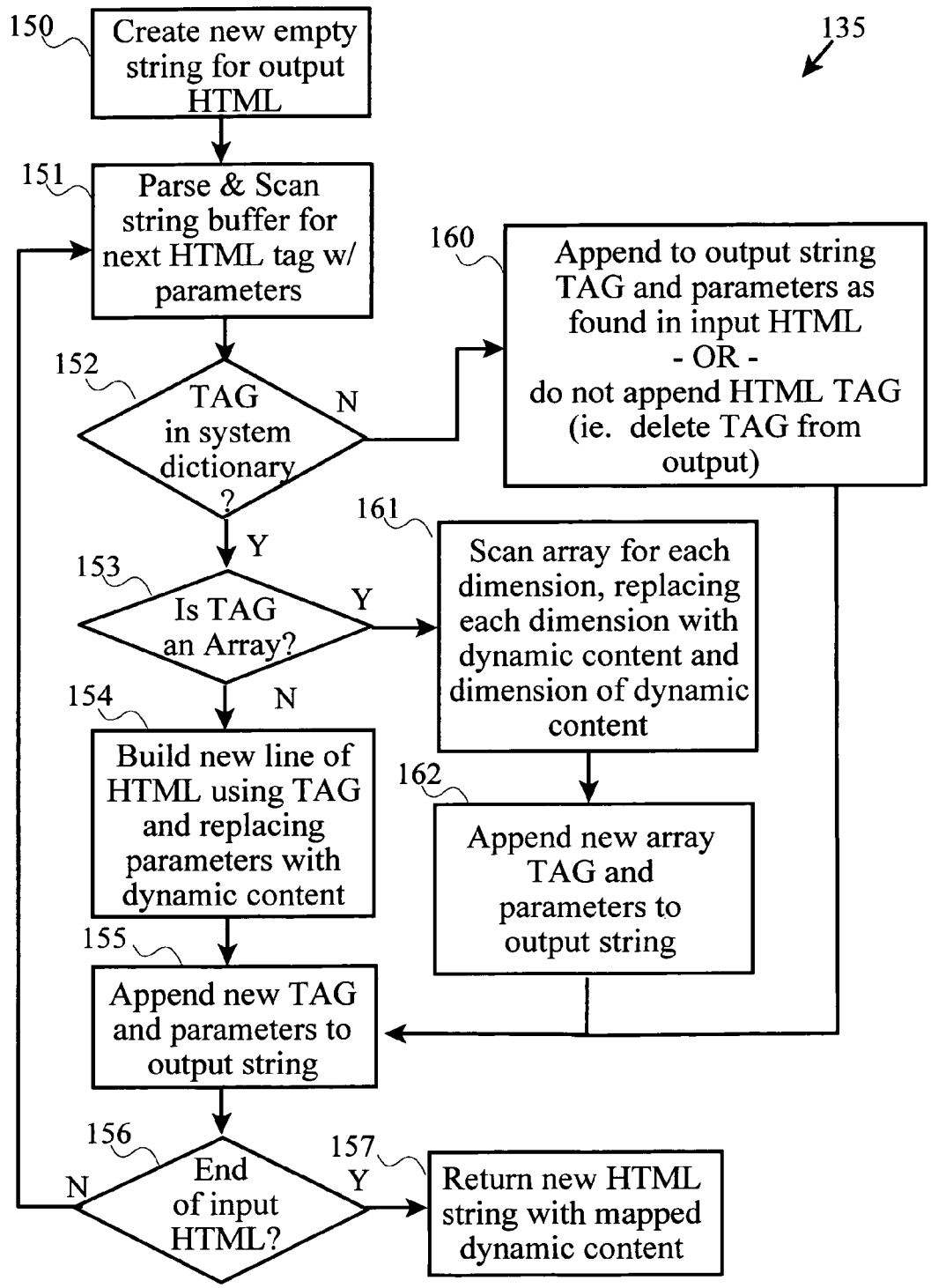

Reading of the lines of text from the HTML template file is preferably done using the "readLine" standard Java method from the JAVA.IO package, which is well known within the art. An outer control construct, such as a "while" or "for" loop, can be used to step through the text lines of the file until end-of-line is detected, appending one or more lines of HTML text from the file into a single string buffer. This allows the entire contents of the HTML template file to be passed to a parsing and mapping process using a single string buffer, which is an optimal format to allow quick and efficient scanning of the string buffer for HTML tags. The standard JAVA "append" method can be used to append the lines of text into the string buffer. For robustness and reliability, the outer control loop preferably contains a maximum number of lines to be processed to detect infinite loop conditions and keep the servlet from "locking up". In the preferred embodiment, another method is implemented which performs the basic parsing and mapping (135) of the single line of HTML text. In alternate embodiments, this could be in-line code of Boson itself, a subroutine, or another function. FIG. 8 depicts the logical flow of the parsing and mapping method (135), a string buffer containing the line of text from the HTML template file and a Quark object, both of which are passed to the method instance by the Boson method described supra.

The parsing and mapping method (135) first tokenizes the contents of the string buffer, preferably using the JAVA standard "toString" method of the package JAVA.IO. The tokens are examined for their contents, searching for HTML tags which exist in the system dictionary, and if they are found, the contents, as defined by each HTML tag, are replaced with the dynamic content. The tag with the new content is appended to an output HTML file.

More specifically, as shown in FIG. 8, the parsing and mapping method (135) creates (150) a new, empty string to hold the output HTML which will be created. Then, the input string, which contains all of the HTML from the template file, is scanned and parsed (151) for HTML tags. For each tag that is found, if the tag is in the system dictionary (152), it is examined to determine if it is an array object, such as a table or drop down list, or a non-array object, such as a block of text. If it is a non-array tag (153), a new line of HTML is built (154) using the HTML tag and the new dynamic content designated for that tag, and the new tag-plus-content is appended to the output HTML string. Then, unless all the input HTML has been processed (156), the next tag is found and processed.

If an HTML tag is found that is an array (153), the array is processed (161) in each of its dimensions similarly to the non-array tag. The parameters of the array, such as number of elements in a drop down list or number of columns and rows in a table, are adjusted to match the dimensions of the dynamic content to be placed into the output file. A new HTML tag and content is then created and appended to the output string (162), and the input HTML string is checked again to see if there are more tags to be processed (156).

If an HTML tag is found in the input string but it is not found in the system dictionary (152), it may be skipped (160) and processing may proceed to the next tag, thereby essentially deleting the tag from the output HTML string so that it does not map from the input HTML to the output HTML. Optionally, the unfound HTML tag may be copied directly from the input string to the output string, causing it to be present unchanged in the output HTML. The preferred embodiment is a JAVA-based implementation, and uses the standard JAVA methods such as "indexOf" to find the position of the next HTML tag within the input HTML string, "get" to determine if a tag is known within the java.util.Dictionary, "substring" for extracting a portion of the input HTML string such as the tag and its contents, and "append" for appending new tags with new content to the output HTML string. For robustness, an outer control loop, such as a "for" or "while" construct, for controlling the maximum number of tags to be processed can preferably be used to keep the parsing and mapping process from being executed in an infinite loop.

Finally, when all the input HTML tags have been processed (156), the new HTML string is ready to be returned (157) to the "calling" process, and eventually the new HTML string will be stored in a new, dynamically mapped HTML file, or may be transmitted to a browser in real-time for viewing and interaction.

It will be understood from the foregoing description that various modifications and changes may be made in the preferred embodiment of the present invention without departing from its true spirit, such as the use of alternate web server platforms, operating systems and data storage means. It is intended that this description is for purposes of illustration only and should not be construed in a limiting sense. The scope of this invention should be limited only by the language of the following claims.

What is claimed is:

1. The method of producing dynamic web page content for transmission on a computer network, comprising the steps of:

providing one or more entries in a system dictionary, each entry representing a static layout tag type to be mapped to one or more dynamic structures;

receiving a first reference to at least one web page portion, said web page portion comprising static layout definitions and static content definitions;

receiving a second reference to alternate web content via an Hyper Text Transfer Protocol Post command;

extracting said layout definitions from said web page;

creating at least one layout template web page from said extracted layout definitions; and mapping said alternate web content into said layout template web page by replacing content parameters associated with said extracted layout definitions for which matching entries are found in said system dictionary, thereby creating at least one web page portion containing said alternate content.

2. The method of producing dynamic web page content of claim 1, wherein said web page portion contains Hyper Text Markup Language.

3. The method of producing dynamic web page content of claim 1, wherein said template web page contains Hyper Text Markup Language.

4. The method of producing dynamic web page content of claim 1, wherein said alternate content web page contains Hyper Text Markup Language.

5. The method of producing dynamic web page content of claim 1, further comprising the step of retrieving said alternate web content from a computer-readable medium.

6. The method of producing dynamic web page content of claim 5, wherein said step of retrieving said alternate web content from a computer-readable medium includes retrieving said alternate content from a computer database.

7. The method of producing dynamic web page content of claim 5, wherein said step of retrieving said alternate web content from a computer-readable medium includes retrieving said alternate content from a computer file system.

8. The method of producing dynamic web page content of claim 5, wherein said step of retrieving said alternate content from a computer-readable medium includes retrieving said alternate web content from a computer network interface.

9. The method of producing dynamic web page content of claim 8, wherein said step of retrieving said alternate web content from a computer network interface includes retrieving said alternate content from a local area network interface.

10. The method of producing dynamic web page content of claim 8, wherein said step of retrieving said alternate web content from a computer network interface includes retrieving said alternate content from an Internet.

11. The method of producing dynamic web page content of claim 1, further comprising providing a servlet for extracting said template web page from said received web page portion.

12. The method of producing dynamic web page content of claim 1, further comprising providing a servlet for mapping said alternate web content into said template web page.

13. The method of producing dynamic web page content of claim 1, further comprising the storing of said alternate web page in a computer-readable media.

14. The method of producing dynamic web page content of claim 1, further comprising transmitting said alternate web page over a computer network.

15. The method of producing dynamic web page content of claim 14 wherein said computer network includes a local area network.

16. The method of producing dynamic web page content of claim 14 wherein said computer network includes an Internet.

17. An article of manufacture comprising:
a computer readable medium suitable for encoding program code means therein or thereon; and
one or more program code means causing a processor to perform the steps of:
(a) providing one or more entries in a system dictionary, each entry representing a static layout tag type to be mapped to one or more dynamic structures;
(b) receiving a first reference to at least one web page portion, said web page portion comprising static layout definitions and static content definitions;
(c) receiving a second reference to alternate web content via an Hyper Text Transfer Protocol Post command;
(d) extracting said layout definition;
(e) creating a template web document using said extracted layout definition;
(f) retrieving alternate web content suitable for mapping into a web document; and
(g) mapping said alternate web content into said template web document by replacing content parameters associated with said extracted layout definitions for which matching entries are found in said system dictionary, thereby creating a web page containing said alternate web content.

18. An article of manufacture according to claim 17, wherein said web page portion comprises a Hyper Text Markup Language web page portion.

19. An article of manufacture according to claim 17, wherein said template web page comprises a Hyper Text Markup Language web page.

20. An article of manufacture according to claim 17, wherein said alternate web page comprises a Hyper Text Markup Language web page.

21. An article of manufacture according to claim 17, wherein said step of receiving a web document portion comprises retrieving said web document portion from a computer database.

22. An article of manufacture according to claim 17, wherein said step of receiving a web document portion comprises retrieving said web document portion from a computer network.

23. An article of manufacture according to claim 22, wherein said step of retrieving said web page portion from a computer network comprises retrieving said web document portion from an Internet.

24. An article of manufacture according to claim 17, wherein said step of receiving a web document portion comprises retrieving said web document portion from a computer file system.

25. An article of manufacture according to claim 17 comprising at least one servlet.

26. An article of manufacture according to claim 25 comprising at least one Java servlet.

27. An article of manufacture according to claim 17, wherein said further comprises code means-for storing said created web page in a computer readable medium.

28. An article of manufacture according to claim 27 wherein said code means for storing said created web page in a computer readable medium comprises code means-for storing said created web page in a computer file system.

29. An article of manufacture according to claim 27 wherein said code for storing said created web page in a computer readable medium comprises code means for storing said created web page in a computer database.

30. An article of manufacture according to claim 17, wherein said code means further comprises code means for transmitting said dynamic web page over a computer network.

31. An article of manufacture according to claim 30, wherein said computer network comprises an Internet.

32. A system for producing web pages containing dynamic content, comprising:
one or more entries in a system dictionary, each entry representing a static layout tag type to be mapped to one or more dynamic structures;
a means for receiving a first reference to a web page portion, said web page having at least one static content definition and an associated layout definition;
a means for extracting said layout definition from said first web page;

a means for receiving a second reference to alternate web content to be mapped into a web page; and a means for mapping said received alternate web content into said extracted layout definition by replacing content parameters associated with said extracted layout definitions for which matching entries are found in said system dictionary, thereby creating a second web page.

33. A system for producing web pages containing dynamic content according to claim 32 wherein said means for receiving a first web page portion includes a means for receiving a Hyper Text Markup Language web page portion.

34. A system for producing web pages containing dynamic content according to claim 33 wherein means for receiving a Hyper Text Markup Language web page portion includes a means for receiving web content from a computer database.

35. A system for producing web pages containing dynamic content according to claim 33 wherein means for receiving a Hyper Text Markup Language web page portion includes a means for receiving web content from a computer file system.

36. A system for producing web pages containing dynamic content according to claim 33 wherein means for receiving a Hyper Text Markup Language web page portion includes a means for receiving web content from a computer network.

37. A system for producing web pages containing dynamic content according to claim 36 wherein means for receiving web content from a computer network includes a means for receiving web pages from an Internet.

38. A system for producing web pages containing dynamic content according to claim 32 wherein said means for extracting said layout definition from said first web page comprises a servlet program.

39. A system for producing web pages containing dynamic content according to claim 32 wherein said means for mapping said alternate web content into said layout definition and creating a second web page comprises a servlet program.

40. A system for producing web pages containing dynamic content according to claim 32 further comprising a means for storing said created web page in a computer database.

41. A system for producing web pages containing dynamic content according to claim 32 further comprising a means for storing said created web page in a computer file system.

42. A system for producing web pages containing dynamic content according to claim 32 further comprising a means for transmitting said created web page over a computer network.

43. A system for producing web pages containing dynamic content according to claim 42 wherein said computer network includes an Internet.

* * * * *